US011145014B2

(12) United States Patent
Perillo et al.

(10) Patent No.: US 11,145,014 B2
(45) Date of Patent: Oct. 12, 2021

(54) MULTI-DESTINATION TRAVEL PLANNING METHODS

(71) Applicant: Perillo Tours, Inc., Woodcliff Lake, NJ (US)

(72) Inventors: Stephen Perillo, Saddle River, NJ (US); David Geil, Redding, CT (US); Jeff Joyce, Hartford, CT (US)

(73) Assignee: Perillo Tours, Inc., Woodcliff Lake, NJ (US)

( * ) Notice: Subject to any disclaimer, the term of this patent is extended or adjusted under 35 U.S.C. 154(b) by 963 days.

(21) Appl. No.: 14/886,386

(22) Filed: Oct. 19, 2015

(65) Prior Publication Data

US 2017/0109845 A1    Apr. 20, 2017

(51) Int. Cl.
| | |
|---|---|
| *G06Q 50/14* | (2012.01) |
| *G06Q 10/02* | (2012.01) |
| *G06Q 30/06* | (2012.01) |
| *G06Q 10/10* | (2012.01) |
| *G06F 3/0484* | (2013.01) |
| *G06F 3/0482* | (2013.01) |
| *G06F 3/0481* | (2013.01) |
| *G06F 3/0486* | (2013.01) |
| *G06Q 10/00* | (2012.01) |

(52) U.S. Cl.
CPC ............ *G06Q 50/14* (2013.01); *G06F 3/0482* (2013.01); *G06F 3/0486* (2013.01); *G06F 3/04817* (2013.01); *G06F 3/04842* (2013.01); *G06F 3/04847* (2013.01); *G06Q 10/00* (2013.01); *G06Q 10/025* (2013.01); *G06Q 10/1097* (2013.01); *G06Q 30/0641* (2013.01)

(58) Field of Classification Search
CPC ...... G06Q 50/14; G06Q 10/00; G06Q 10/025; G06Q 10/1097; G06Q 30/0641; G06F 3/0482; G06F 3/04817; G06F 3/04842; G06F 3/04847; G06F 3/0486
See application file for complete search history.

(56) References Cited

U.S. PATENT DOCUMENTS

| | | | |
|---|---|---|---|
| 8,831,881 B1* | 9/2014 | Baig | .................... G01C 21/343 |
| | | | 701/533 |
| 2006/0216633 A1 | 9/2006 | Kubota | |
| 2007/0143155 A1 | 6/2007 | Whitsett | |
| 2007/0198306 A1* | 8/2007 | Crean | .................... G06Q 10/02 |
| | | | 705/5 |
| 2008/0319803 A1* | 12/2008 | Heyraud | ................ G06Q 10/02 |
| | | | 705/5 |

(Continued)

FOREIGN PATENT DOCUMENTS

| | | |
|---|---|---|
| JP | 2002269190 | 9/2002 |
| JP | 2003150680 | 5/2003 |

(Continued)

OTHER PUBLICATIONS

Intelligent rail-air travel planner Published by Centre for Railway Information Suystems (Year: 1991).*

*Primary Examiner* — Zeina Elchanti
(74) *Attorney, Agent, or Firm* — Wolf, Greenfield & Sacks, P.C.

(57) ABSTRACT

The present invention relates to computer-based methods for preparing multi-destination travel itineraries. The invention includes the use of a graphical interface which permits a consumer to readily make changes to an itinerary.

18 Claims, 11 Drawing Sheets

(56) References Cited

U.S. PATENT DOCUMENTS

| | | | |
|---|---|---|---|
| 2013/0268886 A1* | 10/2013 | Sureshkumar | ............................... G06Q 10/063116 715/810 |
| 2014/0214324 A1* | 7/2014 | Freedman | ................ G01V 5/08 702/8 |
| 2014/0214624 A1* | 7/2014 | Carter | .................... G06Q 50/14 705/26.64 |
| 2014/0278591 A1* | 9/2014 | Blecharczyk | .......... G06Q 10/02 705/5 |
| 2015/0154512 A1* | 6/2015 | Wenger | .................. G06Q 10/02 705/5 |
| 2015/0178642 A1* | 6/2015 | Abboud | ................. G06Q 10/02 705/5 |
| 2017/0228668 A1* | 8/2017 | Oreif | ................... G06Q 10/025 |

FOREIGN PATENT DOCUMENTS

| | | |
|---|---|---|
| JP | 2010146129 | 7/2010 |
| WO | WO2006102134 | 9/2006 |
| WO | WO2007115177 | 10/2007 |

* cited by examiner

FIG. 16

PERILLOTOURS SINCE 1945

Call Toll-Free: 1-800-431-1515

Destination: [____] [GO]

DATES: From [03/24] To [04/05]  No.of Passengers: [4]  [UPDATE]

MARCH 2014

| Sun 23 | | | | | | |
|---|---|---|---|---|---|---|
| | | | | | | 8 |
| | | | | | | 15 |
| | 10 | 11 | 12 | 13 | 14 | |
| 16 | 17 | 18 | 19 | 20 | 21 | 22 |
| 23 | 24 | 25 | 26 | 27 | 28 | |
| 30 | 31 | 1 | 2 | 3 | 4 | 5 |

SELECT HOTELS — 121 [X]

DATES: From [03/24] To [04/05]  No.of Passengers: [4]

No. of Rooms: [ ]  No. of Adults: [ ]  No. of Children: [ ]  Child 1 [ ]  Child 2 [ ]  Child 3 [ ]

Room 1: [ ] [ ] [ ] [ ] [ ] [ ]
Room 2: [ ] [ ] [ ] [ ] [ ] [ ]

| Hotel | # of Passengers: [4] | | Nightly Rate |
|---|---|---|---|
| | Available Terms | On Request Terms | |
| Hotel Domidea | | | $84 |
| ○ Double Room- Queen Bed | | | $84/night |
| ○ Double Room- 2 Double Beds | | | $128/night |
| Hotel Giardino | ☐ | ☐ | $144 |
| Sant'Anna Hotel | ☐ | ☐ | $224 |
| Hotel Teatro di Pompeo | ☐ | ☐ | $88 |
| Relais Trevi 95 | ☐ | ☐ | $144 |
| Hotel Casa Bonitilla | ☐ | ☐ | $88 |
| Hotel delle Vittorie | ☐ | ☐ | $114 |
| San Pietro Rooms | ☐ | ☐ | $133 |

[Previous] [Next]

TRIP SUMMARY

1 ROME — Hotel Domidea, Roma [4]  3 days  $109 ✕

2 FLORENCE — Hotel Annalena, Florence [4]  4 days  $128 ✕

3 MILAN — Hotel Regina, Milan [4]  3 days  $328 ✕

[TRIP SUMMARY]

FIG. 1H

PERILLOTOURS
SINCE 1945

Call Toll-Free: 1-800-431-1515

Destination: [         ] [GO]

DATES: From [📅] 03/24  To [📅] 04/05   No. of Passengers: [4]   [UPDATE]

MARCH 2014    ◄ Today ▶

| Sun 23/31 | M 24 | T 25 | W 26 | T 27 | F 28 | S 1 |
|---|---|---|---|---|---|---|
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 | 1 | 2 | 3 | 4 | 5 |

ADD-ONS — 122 [✖]

| Activity: | No. of Passengers: | Per Person |
|---|---|---|
| Rome City Tours | ☐ | $88 |
| Rome Driving Tours | ☐ | $144 |
| Eyes of Rome Private Tours | [4] | $224 |
| Food Tours of Rome | ☐ | $88 |
| Walks of Italy | ☐ | $144 |
| Through Eternity Cultural Association | ☐ | $88 |
| Tiber Limo-Day Tours | ☐ | $144 |

TRIP SUMMARY

1 ROME  [3 days ✖]
- Hotel Domidea, Roma  [4]  $109
- ☑ Eyes of Rome Private Tours  [4]  $224  ⟵ 119

2 FLORENCE  [4 days ✖]
- Hotel Annalena, Florence  [4]  $128

3 MILAN  [3 days ✖]
- Hotel Regina, Milan  [4]  $328

[Previous] [Next]

[TRIP SUMMARY]

FIG. 1I

PERILLOTOURS
SINCE 1945

Destination: [Hotel Donidea]

Hotel Donidea
Via Adriela Casti, 17
00153 Rome, Province of Rome, Italy
+39 06 9715 9873

DATES: From [ ] 03/24  To [ ] 04/05   No. of Passengers: [ 4 ]   [UPDATE] — 123

Call Toll-Free: 1-800-431-1515

| Sun | | | | | | |
|---|---|---|---|---|---|---|
| | | | | | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 | 1 | 2 | 3 | 4 | 5 |

TRIP SUMMARY

1 ROME — 3 days — $109 [4], $224 [4], $80 [4]
- Hotel Donidea, Roma
- Eyes of Rome Private Tours
- Private Transfer from Hotel to Airport

2 FLORENCE — 4 days — $128 [4]
- Hotel Annalena, Florence

3 MILAN — 3 days — $328 [4]
- Hotel Regina, Milan

TRIP SUMMARY

ROME
Hotel:
 Hotel Donidea, Roma [Terms]
 Double Room- Queen Bed                Check-in: March 24, 2014
                                        Check-out: March 26, 2014
 Total Price:                                               $1,308
Activity:
 Eyes of Rome Private Tours [Terms]   Date of Service: March 24, 2014
 Total Price:                                                 $448
Transfers:
 Private Transfer from Hotel to Airport [Terms]  Date of Service: March 26, 2014
 Total Price:                                                  $80

FLORENCE
Hotel:
 Hotel Annalena, Florence [Terms]
 Double Room- Queen Bed                Check-in: March 27, 2014
                                        Check-out: April 2, 2014
 Total Price:                                                $512

MILAN
Hotel:
 Hotel Regina, Milan [Terms]
 Double Room- Queen Bed                Check-in: April 3, 2014
                                        Check-out: April 5, 2014
 Total Price:                                               $1,312

TOTAL                                                        $3,660

🖨 Print

[ TRIP SUMMARY ]

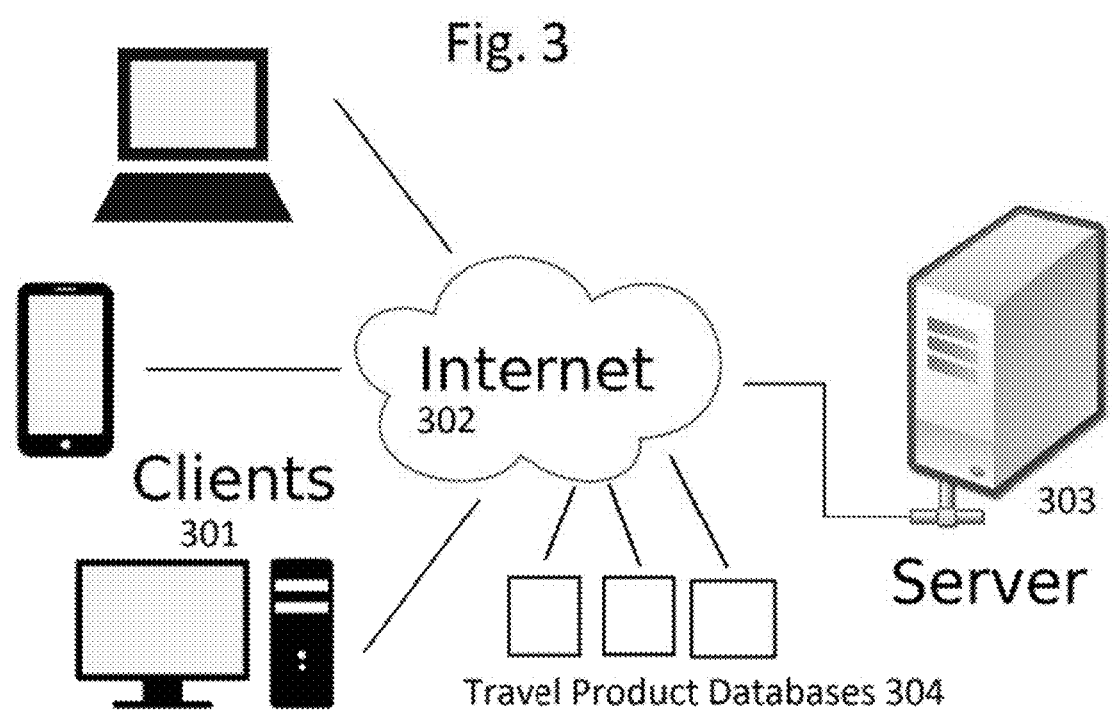

MULTI-DESTINATION TRAVEL PLANNING METHODS

FIELD OF THE INVENTION

The present invention relates to computer-based methods for multi-destination trip planning. In particular, the invention relates to methods for permitting consumers to plan their own travel.

BACKGROUND OF THE INVENTION

Conventionally, travel, especially international travel, requires travel agents to interface with consumers, plan an itinerary and make arrangements for travel products and activities. In more recent years, travel websites have allowed consumers to make their own arrangements. Computer-implemented travel systems and methods on the market generally require users to restart their booking process each time they make intra-trip date and time changes. One example of a computer-implemented trip planner is shown in U.S. Pat. No. 8,825,370 to Hu et al. However, user interfaces in systems on the market could be better adapted to trips involving multiple locations or to allowing users to intuitively make changes to their planned travel itineraries.

SUMMARY OF THE INVENTION

The present invention provides for methods that allow for consumers to make travel plans for complex itineraries that include multiple destinations, to select activities at these destinations, and to check pricing and availability of activities. The present invention provides for methods involving graphical user interfaces that simultaneously display a number of features, including a map of a geographic area and a trip planning calendar. The present invention further provides for methods involving real-time updating of displayed trip information, particularly based on real-time changes made by the user.

BRIEF DESCRIPTION OF THE DRAWINGS

Further features and advantages of the invention may be understood by reviewing the following detailed description of the preferred embodiments of the invention taken together with the attached drawings, in which:

FIGS. 1A-1I show one method for planning a complex travel itinerary according to an embodiment of the present invention.

FIG. 3 is an example of one possible network architecture on which the invention may be carried out.

DETAILED DESCRIPTION OF THE DRAWINGS AND PREFERRED EMBODIMENTS

One or more aspects of the invention may comprise a computer program that embodies the function described and illustrated herein, wherein the computer program is implemented in a computer system that comprises server computer(s) and user computing devices(s) and instructions stored in a machine-readable medium and a centralized or decentralized processor of the server computer(s) and/or user computing device(s) that executes that instructions. However, it should be apparent that the invention could be implemented in different computer programs and network architecture, and the invention should not be construed as limited to any one set of computer program instructions or network architecture. A skilled programmer would be able to write such a computer program and use such network architecture to implement and embodiment of the disclosure invention based on the appended flow chart and drawings and associated description in the application text. Therefore, disclosure of a particular set of program code instructions or network architecture is not considered necessary for an adequate understanding of how to make and use the invention. The inventive functionality of the invention will be explained in more detail in the following description, read in conjunction with the figures illustrating the program.

FIGS. 1A-1I show one method for planning a complex travel itinerary according to an embodiment of the present invention. Reference will be made to the various figures, each of which shows a screenshot of a user interface as presented to the user according to this embodiment. It will be understood that the user interface may be presented to the user via computer-implemented methods known in the art or hereafter developed, for example, by presentation within the user's web browser or other software program window, with the user, using the user interface, submitting information to and receiving information from a centralized or de-centralized server computer or local computer program, any or all of which shall be considered a "server computer." The server computer will have, or have access to, one or ore processors and the ability to communicate with the user's computer. The user may use any computing device capable of such functionality involving the user interface, such as a desktop computer, laptop computer, tablet or smart phone. The graphical user interface may be displayed on a screen which can be manipulated by a keyboard and mouse, a touch screen or other suitable display device.

Figure 1A:
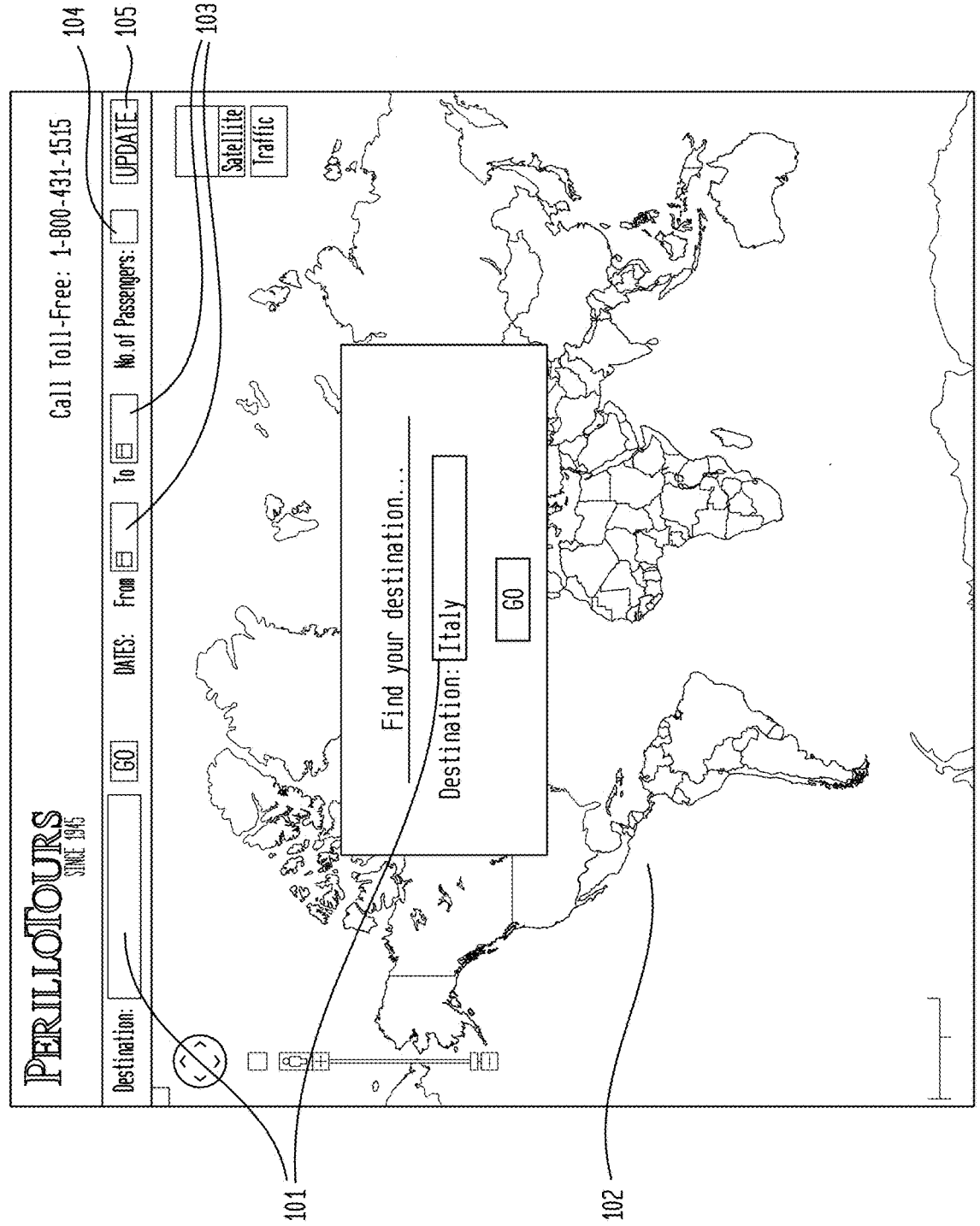

FIG. 1A is a screenshot showing geographic area entry boxes 101, world map 102, travel date entry boxes 103, passenger number box 104 and updated box 105. The user may enter the name of a geographic area into either geographic area entry box 101 and select "GO" in order to send input to the server computer indicative of the geographic area. The geographic area may be specified in any fashion, for example, by neighborhood, by state, by province, by country, by continent, or by any other geographic region that is known to be significant to the planning of vacation travel Dropdown boxes may be used to allow users to select geographic areas based on portions of names that they have typed in, or the user may select from a plurality of pre-determined destinations. Other methods of data entry may be used. World map 102 is illustrative of one background graphic, and may be replaced with any other background. Travel date entry boxes 103 allow for the user to indicate a beginning travel date and an end travel date, which information may be received by the server computer. The user may enter only one of these dates, for example, only the beginning travel date. Passenger number box 104 allows the user to indicate to the server computer the intended number of passengers on the trip. Update box 105 allows for the information inputted by the user to be sent to the server computer. However, the information may also be sent without the user selecting update box 105, periodically, or whenever information is updated by the user.

Figure 1B:
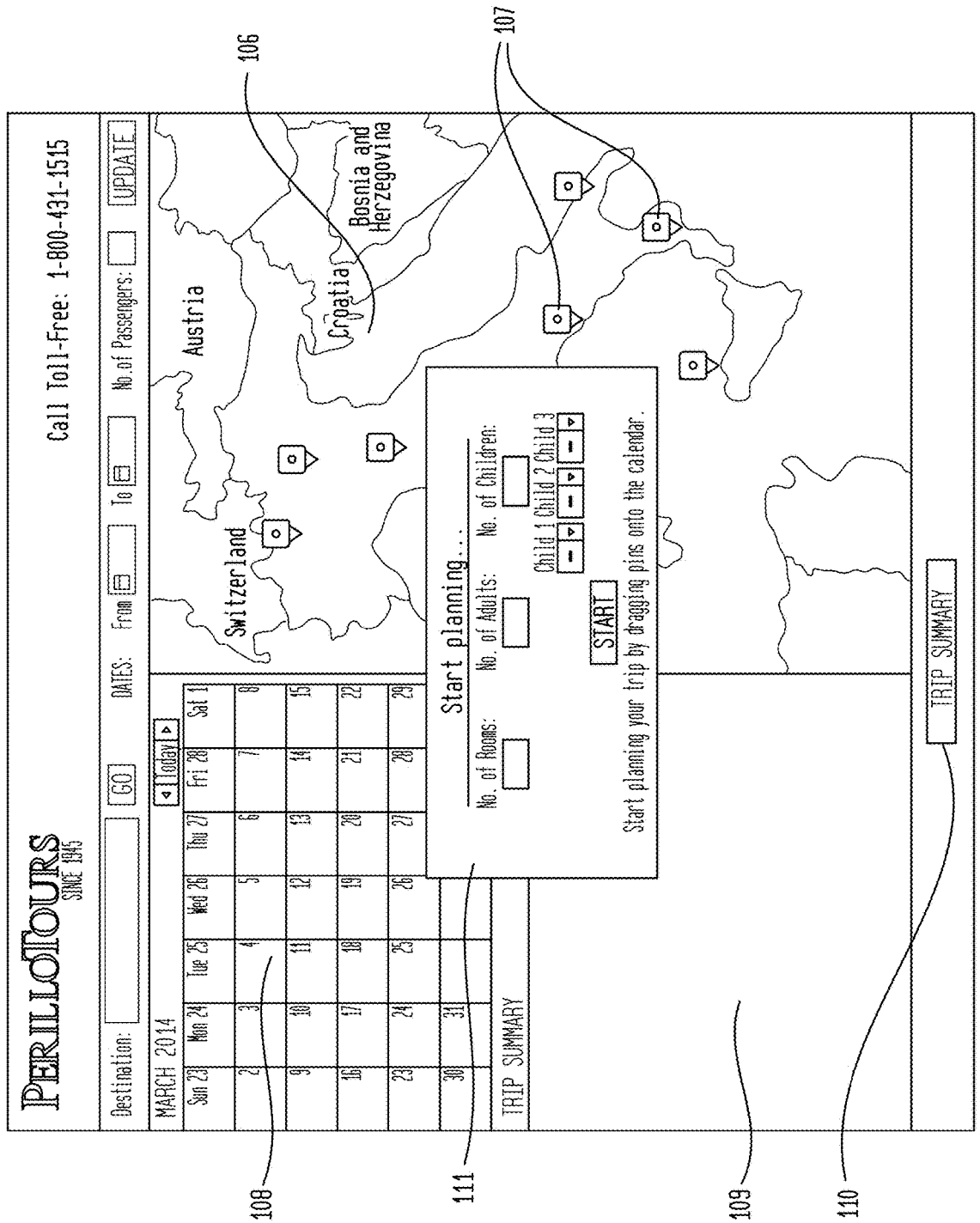

FIG. 1B is a screenshot showing a map 106 of the geographic area, destination icons 107 corresponding to a plurality of destinations within the geographic area, calendar 108, trip summary area 109, trip summary box 110, and planning box 111. The geographic area shown in the map 106 is based on the information indicative of a geographic area sent to the server computer by the user, as discussed above. The selection of the exact geographic area shown on the map 106 may be based on minimum and maximum latitude and longitude lookups for the user-indicated geographic area, by way of example.

The destination icons 107 are shown in FIG. 1B as pins, although other icons may be used. For ease of reading, only two of the seven destination icons are labeled with reference numerals in FIG. 1B. The location of these destination icons 107 may be pre-selected based on points of particular popularity within the geographic area. Additional destination icons 107 corresponding to additional destinations may be added by the user, such as by clicking on other destinations within the map 106.

Calendar 108 shows a span of time based on the information indicative of a beginning travel date and/or an end travel date submitted by the user. For example, the days, weeks, or months of either or both of these dates (and/or those between these dates, inclusive) may be shown.

Planning box 111 allows a user to send to the server computer information which may be useful in planning the itinerary, such as the number of hotel rooms which may be required, the number of adults, and the number and ages of children on the trip.

Figure 1C:
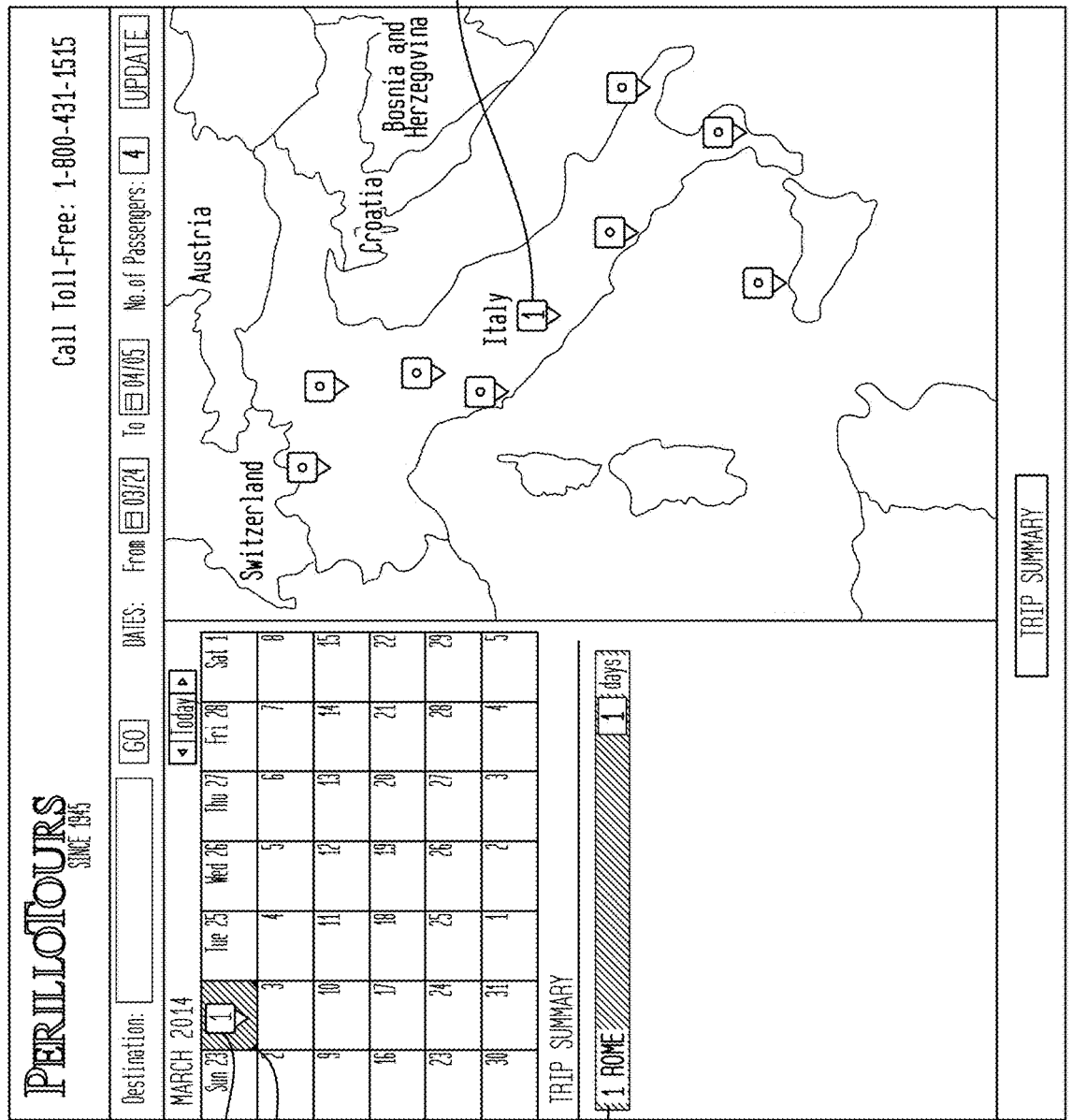

FIG. 1C is a screenshot showing calendar icon 112, updated destination icon 113, calendar destination date indicator 114, and trip summary element 115. The screenshot shown in FIG. 1C arose from the user selecting a destination icon 107 corresponding to Rome from the map 106 and dragging the icon, for example, by performing a gesture using an input device such as a mouse or touchscreen, to a date on calendar 108. However, other methods of indicating a date or date range for the destination may be used, such as selection of beginning and/or end dates from a drop-down menu. The calendar icon 108 may correspond in number and/or color and/or by other visual indicator to trip summary element 115, and may correspond in number and/or color and/or by other visual indicator to updated destination icon 113. Calendar destination date indicator 114 shows a date range of one or more days associated with the destination, for example, by color shading. The date range may be adjusted by user to indicate modified date ranges to the server computer, such as by dragging the triangles (also referred to as "handles") at either lower side of the indicator 114, or by entering a new number of days into a box in the trip summary element 115.

Figure 1D:
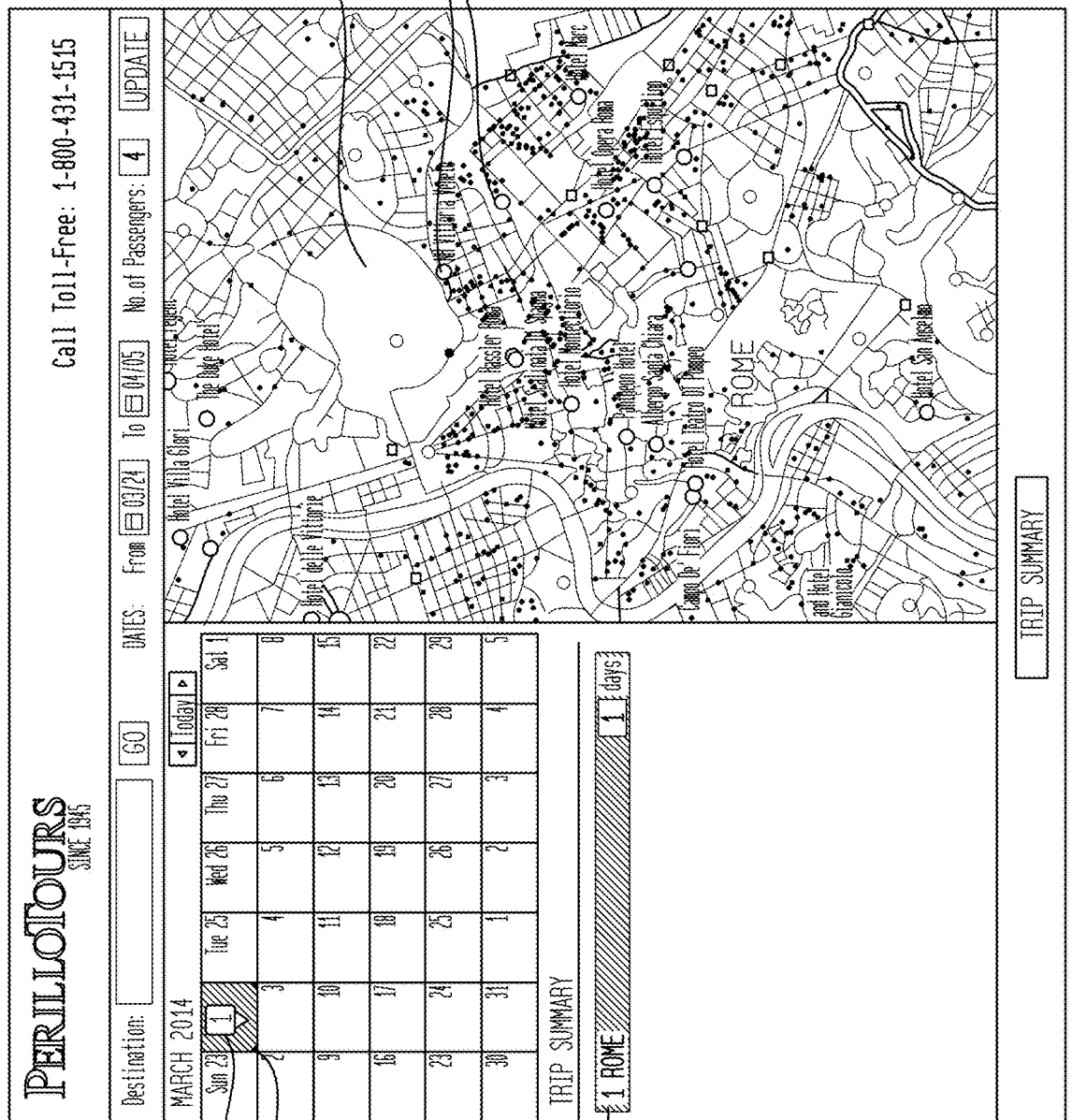

FIG. 1D is a screenshot showing a zoomed-in version 116 of the map 106, on the selected destination (here, Rome). A number of travel products 117 are shown on the map, here, hotel stays. The type of travel product 117 shown may be based on an indication of the type of travel product sought by the user. Travel product types may include, for example, airfare, hotel stays, car rentals, activities, or packages of two or more of the foregoing.

Figure 1E:
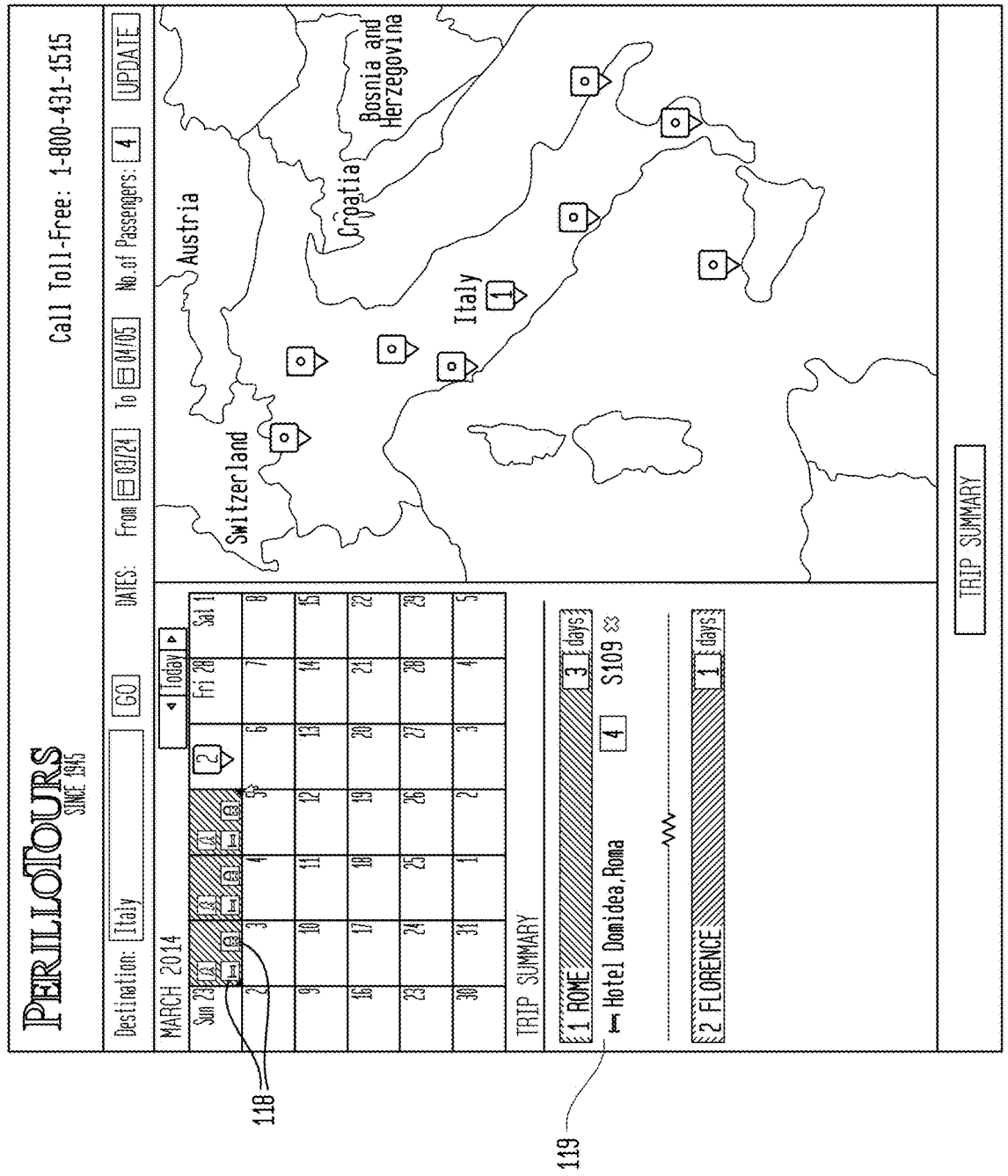

FIG. 1E is a screenshot showing a plurality of calendar travel product item icons 118 (only two of the nine being labeled for ease of reference), as well as price and availability information 119 relating to a selected travel product type (here, hotel stays), one amongst a plurality of selected destinations (here, Rome from amongst Rome and Florence), and a date range corresponding to the date range for at least one the plurality of destinations (here, Rome's date range). The information shown with the price and availability information may include price (for example, with respect to hotel stays, per night, per room, and/or total), available number of rooms and/or number of rooms sought, and an option to delete the information. The price and availability information may be updated in realtime, periodically, and/or upon a request from the user. It will be understood that updating may be performed at any or every time that the user indicates a change to one or more parameters of the trip, by way of example, a new, removed, or changed travel product and/or a new, removed, or changed destination. The updating takes place at the server computer by referencing a live database of travel product prices and availabilities.

In FIG. 1E, two destinations have been selected (Rome and Florence), the destinations being color and number-coded in the map, trip summary and calendar.

Figure 1F:
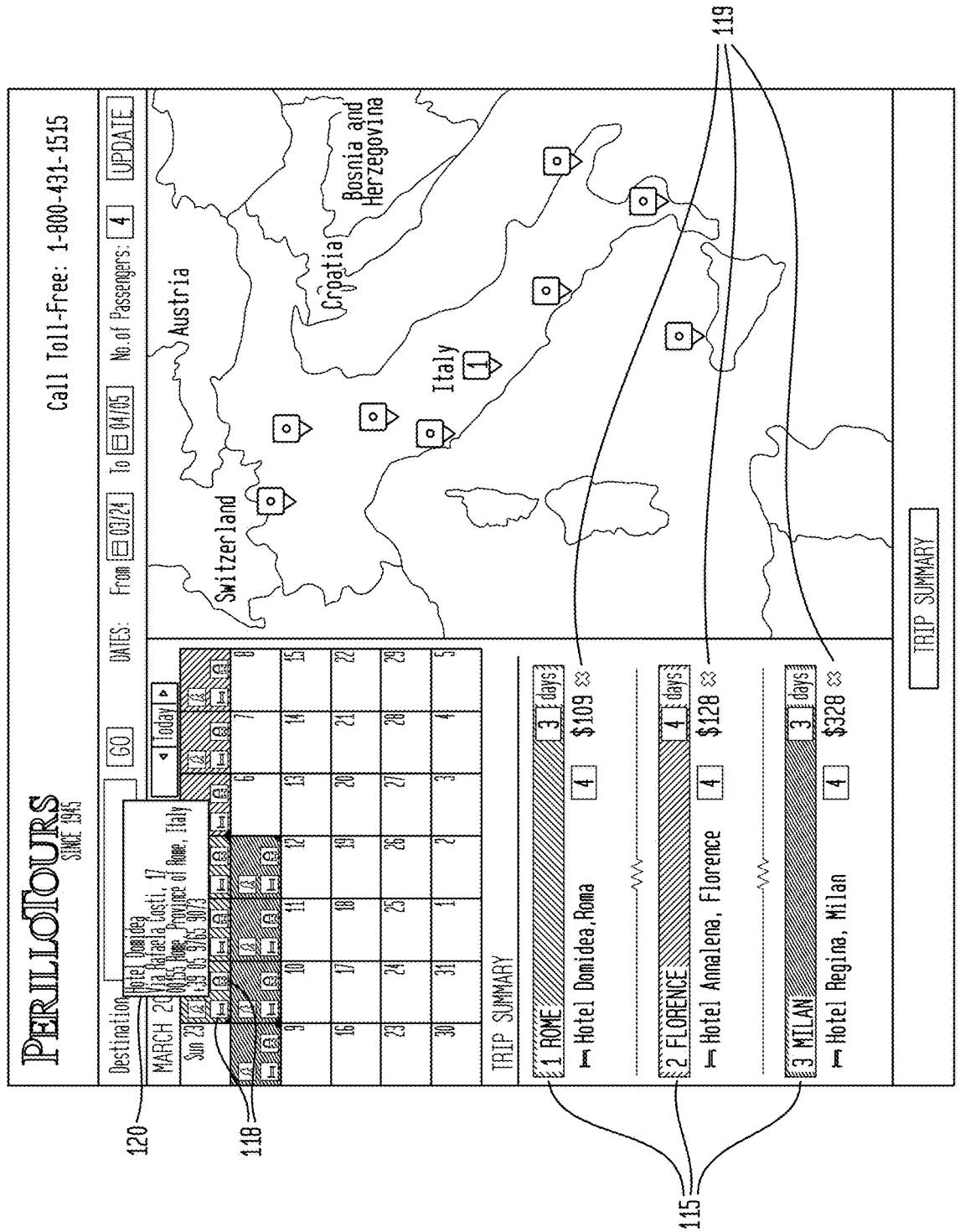

In FIG. 1F, three destinations have been selected, and accordingly there are three corresponding trip summary elements 115. Also shown are price and availability information 119 for three travel products (here, hotel stays). Additional information 120 for one of these travel products is shown in association with a calendar icon corresponding to that travel product.

In FIG. 1G, a travel product selection menu 121 is shown, providing price and availability information for travel products based on the user's selected dates and destinations. Users may use this menu 121 to input additional information (for example, particular date ranges and number and type of rooms sought and trip participants) to filter the information shown. Users may also use this menu to select travel products to be added to the itinerary. The travel product selection menu may be placed or configured so as not to obscure other information in the user interface, such as by making it adjustably sized or located or partially transparent.

FIG. 1H shows different travel product selection menu 122 for tours. Price and availability information 119 are shown in the trip summary, and in this travel product selection menu 122. It will be understood that similar menus, icons, and price and availability information can be presented for any type of travel product, for example, for airfare, hotel stays, car rentals, activities, or packages of two or more of the foregoing.

FIG. 1I shows a detailed trip summary 123 which is an expanded version of the textual trip summary shown at the bottom-left of this figure. This may be presented to the user, for example, upon clicking on the trip summary box 110.

Figure 2:
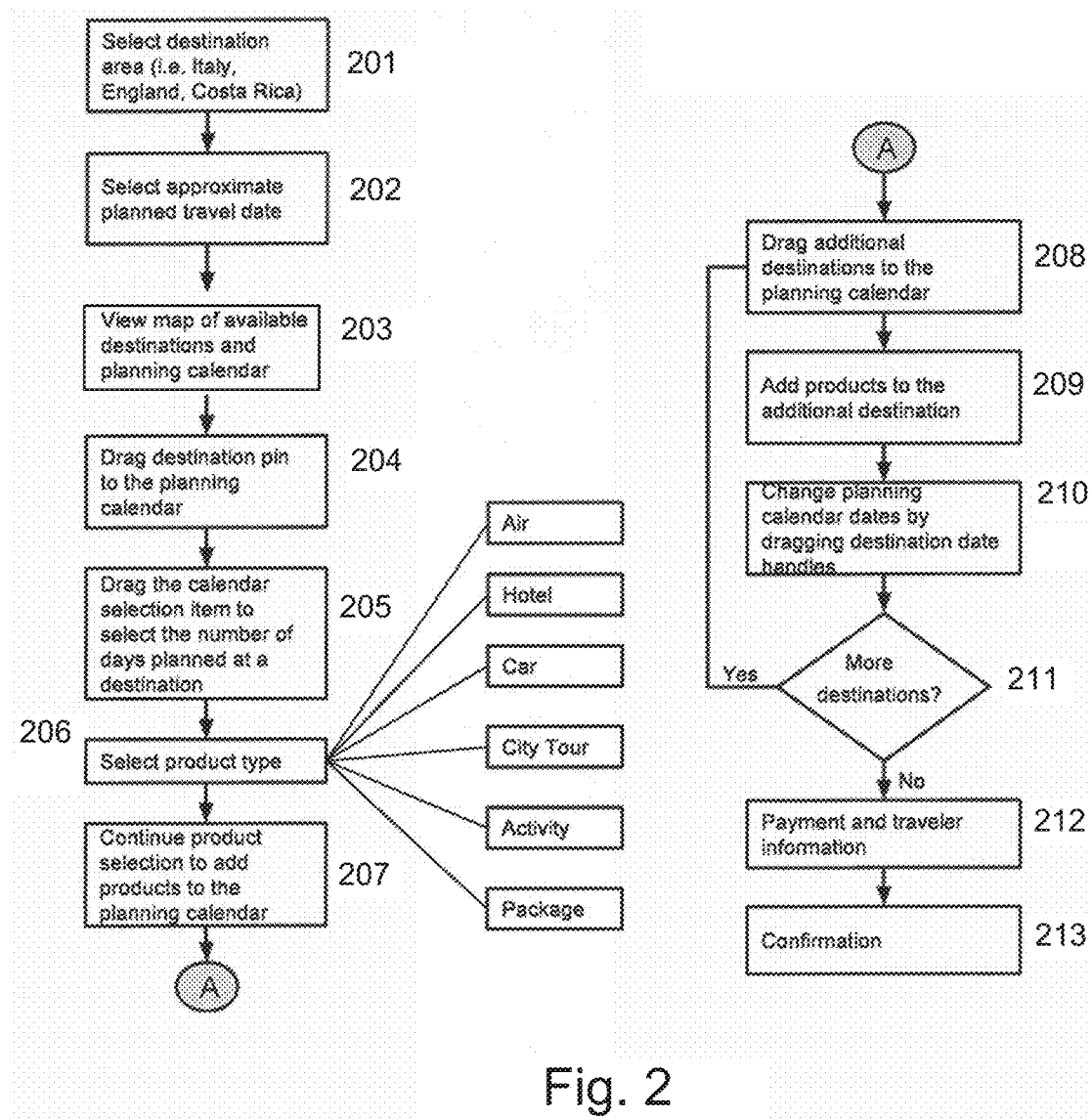
FIG. 2 is a flow chart, from a user perspective, showing a method for preparing a complex travel itinerary according to a further embodiment of the present invention.

FIG. 2 is a flow chart, from a user perspective, showing a method for preparing a complex travel itinerary according to a further embodiment of the present invention. Step 201 may be performed, for example, using one of the geographic area entry boxes 101 of FIG. 1A, or using other data entry methods. Step 202 may be performed, for example, using travel date entry boxes 103, or using other data entry methods. Step 202 may be performed, for example, using map 106 and calendar 108 of FIG. 1B. Step 204 may be performed using the destination icons 107, a mouse or other input device, and the calendar 108. A possible result of such step is shown in FIG. 1C. Step 205 may be performed, for example, using the triangles (also referred to as "handles") at either lower side of indicator 114, or using other computerized calendar item re-dating methods A possible result of such step is shown in the expanded green calendar region of FIG. 1E. Product types may be selected in step 206, using such computerized selection methods as are known in the art. For example, a user may choose to search for flights, hotel stays, car rentals, tours, activities, packages of two or more of the foregoing, or other travel products types. Price and availability information may be shown to the user, which information may be automatically determined, by the server computer, based on the date range and destination that the user has selected, and displayed to the user. For example, price and availability information for the hotel stay product type is shown in FIG. 1G. Products of the product type may be selected by the user to be added to the calendar at step 207. One or more additional destinations may be added to the planning calendar at step 208, for example, in a similar manner as the previous destinations. Color coding and/or chronological or non-chronological number coding and/or other visual indicators may be used to organize the various destinations. At step 209, additional products may be added to the calendar for one or more of the added destinations. At step 210, the dates associated with additional destination may be changed, for example, in a similar manner as in step 205. The price and availability information may be automatically redetermined when the dates are changed. This process of steps 208 through 210 is repeated until the user decides he or she does not wish to add any additional destinations (step 211). At that point, at steps 212-213, the user may purchase one or more or all of the various travel products he has selected for the calendar. It will be understood that this purchasing process may comprise obtaining payment and identifying information from the user, or using previously obtained payment and identifying information, and obtaining confirmation of the purchase from the user. Such computerized checkout methods as are known in the art may be employed. The various travel products may be purchased in a single transaction or in a number of transactions. Users may purchase all of their travel products at the end of the itinerary planning processes discussed herein, or may purchase certain travel products over the course of the itinerary planning processes discussed herein.

FIG. 3 is an example of one possible network architecture on which the invention may be carried out. Each of the client computing devices 301 on which the user interface is shown may be connected, via the Internet 302, to server computer 303, which has a processor. Server computer 303 may be connected, also via the Internet 302, to travel product databases 304.

In one embodiment, there is a method for preparing a travel itinerary involving receiving, at a server computer, input from a user indicative of a geographic area, entered by the user using a computing device, receiving, at the server computer, input from the user indicative of a beginning travel date, entered by the user using the computing device, causing a graphical user interface to be displayed on the computing device in response to the input, the graphical user interface simultaneously showing a map of the geographic area and a calendar, allowing the user to select using the computing device a plurality of destinations using the map, and receiving, at the server computer, input from the user indicative of the plurality of destinations, allowing the user to select using the computing device a date range for each of the plurality of destinations using the calendar, and receiving, at the server computer, input from the user indicative of the date range for each of the plurality of destinations, receiving, at the server computer, input from the user indicative of at least one travel product type, entered by the user using the computing device, determining in a processor of the server computer, and causing to be shown on the graphical user interface simultaneously with the map and the calendar, price and availability information relating to (i) the travel product type, (ii) at least one of the plurality of destinations, and (iii) at least one date range corresponding to the at least one of the plurality of destinations, allowing the user to modify using the computing device the date range for at least one of the plurality of destinations using the calendar, and receiving, at the server computer, input from the user indicative of the modified date range, upon receiving the input from the user indicative of the modified date range, and without awaiting further input from the user, determining in the processor of the server computer, and causing to be shown on the graphical user interface simultaneously with the map and the calendar, price and availability information relating to (i) the travel product type, (ii) the modified date range, and (iii) the destination corresponding to the modified date range, and allowing the user to select using the computing device an available travel product of the travel product type, receiving, at the server computer, input from the user indicative of the selected travel product, and causing the selected travel product to be shown on the calendar.

A further embodiment of this method involves receiving payment information, traveler information, and purchase confirmation from the user.

In yet a further embodiment of this method, the (i) allowing the user to select a plurality of destinations using the map, and receiving input from the user indicative of plurality of destinations, and (ii) allowing the user to select a date range for each of the plurality of destinations using the calendar, and receiving input from the user indicative of the date range for each of the plurality of destinations, involve allowing the user to drag icons appearing on representations of the plurality of destinations on the map to the calendar. The icon on the map may be a pin. The allowing the user to select a date range for each of the plurality of destinations using the calendar, and receiving input from the user indicative of the date range for each of the plurality of destinations, may further involve allowing the user to drag at least one icon appearing on the calendar.

In yet another embodiment, the allowing the user to modify the date range for at least one of the plurality of destinations using the calendar, and receiving input from the user indicative of the modified date range, involve allowing the user to drag at least one icon appearing on the calendar from a first date to a second date.

The travel product type may be airfare, a hotel stay, a car rental, an activity, and/or a package of two or more of the foregoing.

The graphical user interface may also simultaneously show, in addition to and apart from the map and the calendar, a textual trip summary.

In a further embodiment, the method involves receiving input from the user indicative of an additional travel product type, determining, and causing to be shown on the graphical user interface simultaneously with the map and the calendar, price and availability information relating to the additional travel product type, and allowing the user to select an available travel product of the additional travel product type, receiving input from the user indicative of the selected travel product of the additional travel product type, and causing the selected travel product of the additional travel product type to be shown on the calendar.

The selected travel product is caused to be shown on the map.

In one more embodiment, there is color-coding and/or number-coding, by destination, of the map, calendar, and price and availability information.

In an additional embodiment, there is a method for preparing a travel itinerary involving receiving, at a server computer, input from a user indicative of a geographic area, entered by the user using a computing device, receiving, at the server computer, input from the user indicative of a beginning travel date, entered by the user using the computing device, causing a graphical user interface to be displayed on the computing device in response to the input, the graphical user interface simultaneously showing a map of the geographic area and a calendar, allowing the user to select using the computing device a plurality of destinations using the map, and receiving, at the server computer, input from the user indicative of the plurality of destinations, allowing the user to select using the computing device a date range for each of the plurality of destinations using the calendar, and receiving, at the server computer, input from the user indicative of the date range for each of the plurality of destinations, receiving, at the server computer, input from the user indicative of a first travel product type, entered by the user using the computing device, determining in a processor of the server computer, and causing to be shown on the graphical user interface simultaneously with the map and the calendar, price and availability information relating to (i) the first travel product type, (ii) at least one of the plurality of destinations, and (iii) at least one date range corresponding to the at least one of the plurality of destinations, receiving, at the server computer, input from the user indicative of a second travel product type which is different from the first travel product type, entered by the user using the computing device, upon receiving the input from the user indicative of the second travel product type, and without awaiting further input from the user, determining in the processor of the server computer, and causing to be shown on the graphical user interface simultaneously with the map and the calendar, price and availability information relating to (i) the second travel product type, (ii) at least one of the plurality of destinations, and (iii) at least one date range corresponding to the at least one of the plurality of destinations; and allowing the user to select using the computing device an available travel product of the first travel product type or the second travel product type, receiving, at the server computer, input from the user indicative of the selected travel product, and causing the selected travel product to be shown on the calendar.

In yet an additional embodiment of the present invention, there is a method for preparing a travel itinerary comprising receiving, at a server computer, input from a user indicative of a geographic area, entered by the user using a computing device, receiving, at the server computer, input from the user indicative of a beginning travel date, entered by the user using the computing device, causing a graphical user interface to be displayed on the computing device in response to the input, the graphical user interface simultaneously showing a map of the geographic area and a calendar, allowing the user to select using the computing device a plurality of destinations using the map, and receiving, at the server computer, input from the user indicative of the plurality of destinations, allowing the user to select using the computing device a date range for each of the plurality of destinations using the calendar, and receiving, at the server computer, input from the user indicative of the date range for each of the plurality of destinations, receiving, at the server computer, input from the user indicative of at least one travel product type, entered by the user using the computing device, determining in a processor of the server computer, and causing to be shown on the graphical user interface simultaneously with the map and the calendar, price and availability information relating to (i) the travel product type, (ii) at least one of the plurality of destinations, and (iii) at least one date range corresponding to the at least one of the plurality of destinations, allowing the user to select using the computing device a first available travel product of the travel product type, receiving, at the server computer, input from the user indicative of the first available travel product, and causing the first available travel product to be shown on the calendar; and allowing the user to select using the computing device a second available travel product of the travel product type, receiving, at the server computer, input from the user indicative of the second available travel product, and, upon receiving the input from the user indicative of the second available travel product, and without awaiting further input from the user, causing the second available travel product to be shown on the calendar.

Further modification may be made without departing from the spirit and range of the invention.

What is claimed is:

1. A method for preparing a multi-destination travel itinerary, the method comprising:
receiving, at a server computer, input from a user indicative of a geographic area of a multi-destination trip, entered by the user using a computing device;
receiving, at the server computer, input from the user indicative of a beginning travel date, entered by the user using the computing device;
causing a graphical user interface to be displayed on the computing device in response to the inputs received from the user indicative of the geographic area of the multi-destination trip and indicative of the beginning travel date, the graphical user interface simultaneously showing a map of the geographic area of the multi-destination trip and a calendar showing a range of days including the beginning travel date;
allowing the user to select using the computing device a plurality of destinations of the multi-destination trip by interacting with the map, each destination of the plurality of destinations of the multi-destination trip corresponding to a geographic subregion of the geographic area of the multi-destination trip, and receiving, at the server computer, input from the user indicative of the plurality of destinations of the multi-destination trip;
allowing the user to select using the computing device a date range for each destination of the plurality of destinations of the multi-destination trip by interacting with the calendar, and receiving, at the server computer, input from the user indicative of the date range for each destination of the plurality of destinations of the multi-destination trip;
receiving, at the server computer, input from the user indicative of at least one travel product type, entered by the user using the computing device;
determining in a processor of the server computer, and causing to be shown on the graphical user interface simultaneously with the map and the calendar, price and availability information relating to (i) the travel product type, (ii) the plurality of destinations of the multi-destination trip selected by the user, and (iii) the selected date ranges corresponding to the plurality of destinations of the multi-destination trip selected by the user;
allowing the user to modify using the computing device the date range for a destination of the plurality of destinations of the multi-destination trip by interacting with the calendar, and receiving, at the server computer, input from the user indicative of the modified date range;
upon receiving the input from the user indicative of the modified date range, and without awaiting further input from the user, determining in the processor of the server computer, and causing to be shown on the graphical user interface simultaneously with the map and the calendar, price and availability information relating to (i) the travel product type, (ii) the modified date range, and (iii) the destination corresponding to the modified date range; and allowing the user to select using the computing device an available travel product of the travel product type and relating to a destination of the plurality of destinations of the multi-destination trip, and receiving, at the server computer, input from the user indicative of the selected travel product, and causing the selected travel product to be shown on the calendar.

2. The method of claim 1, further comprising receiving payment information, traveler information, and purchase confirmation from the user.

3. The method of claim 1, wherein (i) the allowing of the user to select the plurality of destinations of the multi-destination trip, and the receiving of the input from the user indicative of the plurality of destinations of the multi-destination trip, and (ii) the allowing of the user to select a date range for each destination of the plurality of destinations of the multi-destination trip, and the receiving of the input from the user indicative of the date range for each destination of the plurality of destinations of the multi-destination trip comprise allowing the user to drag icons appearing on the map to the calendar, the icons appearing on the map on representations of the plurality of destinations of the multi-destination trip, each icon corresponding to a geographic subregion of the geographic area on the map.

4. The method of claim 3, wherein the icons appearing on the map are pins.

5. The method of claim 3, wherein the allowing of the user to select a date range for each destination of the plurality of destinations of the multi-destination trip by interacting with the calendar, and the receiving of the input from the user indicative of the date range for each destination of the plurality of destinations of the multi-destination trip further comprises allowing the user to drag at least one icon appearing on the calendar.

6. The method of claim 1, wherein the allowing of the user to modify the date range for a destination of the plurality of destinations of the multi-destination trip by interacting with the calendar, and the receiving of the input from the user indicative of the modified date range comprises allowing the user to drag at least one icon appearing on the calendar from a first date to a second date.

7. The method of claim 1, wherein the travel product type is airfare.

8. The method of claim 1, wherein the travel product type is a hotel stay.

9. The method of claim 1, wherein the travel product type is a car rental.

10. The method of claim 1, wherein the travel product type is an activity.

11. The method of claim 1, wherein the travel product type is a package of two or more of: airfare, hotel stay, car rental and activity.

12. The method of claim 1, wherein the graphical user interface also simultaneously shows, in addition to and apart from the map and the calendar, a textual trip summary.

13. The method of claim 1, further comprising:

receiving input from the user indicative of an additional travel product type;

determining, and causing to be shown on the graphical user interface simultaneously with the map and the calendar, price and availability information relating to the additional travel product type; and allowing the user to select an available travel product of the additional travel product type, receiving input from the user indicative of the selected travel product of the additional travel product type, and causing the selected travel product of the additional travel product type to be shown on the calendar.

14. The method of claim 1, further comprising causing the selected travel product to be shown on the map.

15. The method of claim 1, further comprising color-coding, by destination, the map, calendar, and price and availability information.

16. The method of claim 1, further comprising number-coding, by destination, the map, calendar, and price and availability information.

17. A method for preparing a multi-destination travel itinerary, the method comprising:

receiving, at a server computer, input from a user indicative of a geographic area of a multi-destination trip, entered by the user using a computing device;

receiving, at the server computer, input from the user indicative of a beginning travel date, entered by the user using the computing device;

causing a graphical user interface to be displayed on the computing device in response to the inputs received from the user indicative of the geographic area of the multi-destination trip and indicative of the beginning travel date, the graphical user interface simultaneously showing a map of the geographic area of the multi-destination trip and a calendar showing a range of days including the beginning travel date;

allowing the user to select using the computing device a plurality of destinations of the multi-destination trip by interacting with the map, each destination of the multi-destination trip corresponding to a geographic subregion of the geographic area of the multi-destination trip, and receiving, at the server computer, input from the user indicative of the plurality of destinations of the multi-destination trip;

allowing the user to select using the computing device a date range for each destination of the plurality of destinations of the multi-destination trip by interacting with the calendar, and receiving, at the server computer, input from the user indicative of the date range for each destination of the plurality of destinations of the multi-destination trip;

receiving, at the server computer, input from the user indicative of a first travel product type, entered by the user using the computing device;

determining in a processor of the server computer, and causing to be shown on the graphical user interface simultaneously with the map and the calendar, price and availability information relating to (i) the first travel product type, (ii) the plurality of destinations of the multi-destination trip selected by the user, and (iii) the selected date ranges corresponding to the plurality of destinations of the multi-destination trip selected by the user;

receiving, at the server computer, input from the user indicative of a second travel product type which is different from the first travel product type, entered by the user using the computing device;

upon receiving the input from the user indicative of the second travel product type, and without awaiting further input from the user, determining in the processor of the server computer, and causing to be shown on the graphical user interface simultaneously with the map and the calendar, price and availability information relating to (i) the second travel product type, (ii) at least one destination of the plurality of destinations of the multi-destination trip, and (iii) at least one date range corresponding to the at least one destination of the plurality of destinations of the multi-destination trip; and allowing the user to select using the computing device an available travel product of the first travel product type or the second travel product type and relating to a destination of the plurality of destinations corresponding to a geographic subregion of the geographic area of the multi-destination trip, and receiving, at the server computer, input from the user indicative of the selected travel product, and causing the selected travel product to be shown on the calendar.

18. A method for causing to simultaneously be shown on a graphical user interface a map, a calendar, and price and availability information relating to (i) a travel product type, (ii) a plurality of destinations of a multi-destination trip, and (iii) a plurality of date ranges corresponding to the plurality of destinations of the multi-destination trip, the method comprising:

receiving, at a server computer, input from a user indicative of a geographic area of the multi-destination trip, entered by the user using a computing device;

receiving, at the server computer, input from the user indicative of a beginning travel date, entered by the user using the computing device;

causing a graphical user interface to be displayed on the computing device in response to the inputs received from the user indicative of the geographic area of the multi-destination trip and indicative of the beginning travel date, the graphical user interface simultaneously showing a map of the geographic area of the multi-destination trip and a calendar showing a range of days including the beginning travel date;

allowing the user to select using the computing device the plurality of destinations of the multi-destination trip by interacting with the map, each destination of the plurality of destinations of the multi-destination trip corresponding to a geographic subregion of the geographic area of the multi-destination trip, and receiving, at the server computer, input from the user indicative of the plurality of destinations of the multi-destination trip;

allowing the user to select using the computing device a date range for each destination of the plurality of destinations of the multi-destination trip by interacting with the calendar, and receiving, at the server computer, input from the user indicative of the date range for each destination of the plurality of destinations of the multi-destination trip;

receiving, at the server computer, input from the user indicative of at least one travel product type, entered by the user using the computing device;

determining in a processor of the server computer, and causing to be shown on the graphical user interface simultaneously with the map and the calendar, price and availability information relating to (i) the travel product type, (ii) the plurality of destinations of the multi-destination trip selected by the user, and (iii) the selected date ranges corresponding to the plurality of destinations of the multi-destination trip selected by the user;

allowing the user to select using the computing device a first available travel product of the travel product type and relating to a destination of the plurality of destinations of the multi-destination trip, the first destination corresponding to a geographic subregion of the geographic area of the multi-destination trip, receiving, at the server computer, input from the user indicative of the first available travel product, and causing the first available travel product to be shown on the calendar; and allowing the user to select using the computing device a second available travel product of the travel product type and relating to another destination of the plurality of destinations of the multi-destination trip, the another destination corresponding to a geographic subregion of the geographic area of the multi-destination trip, receiving, at the server computer, input from the user indicative of the second available travel product, and, upon receiving the input from the user indicative of the second available travel product, and without awaiting further input from the user, causing the second available travel product to be shown on the calendar.

* * * * *